(12) United States Patent
Takano

(10) Patent No.: US 10,606,314 B1
(45) Date of Patent: Mar. 31, 2020

(54) ELECTRONICS STAND

(71) Applicant: Fujitsu Client Computing Limited, Kanagawa (JP)

(72) Inventor: Minoru Takano, Kawasaki (JP)

(73) Assignee: FUJITSU CLIENT COMPUTING LIMITED, Kanagawa (JP)

(*) Notice: Subject to any disclaimer, the term of this patent is extended or adjusted under 35 U.S.C. 154(b) by 0 days.

(21) Appl. No.: 16/443,964

(22) Filed: Jun. 18, 2019

(30) Foreign Application Priority Data

Dec. 5, 2018 (JP) .................. 2018-228505

(51) Int. Cl.
| | |
|---|---|
| *G06F 1/16* | (2006.01) |
| *F16M 11/10* | (2006.01) |
| *F16M 11/20* | (2006.01) |
| *F16M 11/38* | (2006.01) |
| *F16B 1/00* | (2006.01) |
| *F16M 13/02* | (2006.01) |

(52) U.S. Cl.
CPC ............ *G06F 1/1632* (2013.01); *F16B 1/00* (2013.01); *F16M 11/105* (2013.01); *F16M 11/2021* (2013.01); *F16M 11/38* (2013.01); *F16M 13/022* (2013.01); *G06F 1/166* (2013.01); *G06F 1/1626* (2013.01); *F16B 2001/0035* (2013.01); *G06F 2200/1633* (2013.01)

(58) Field of Classification Search
CPC ...... G06F 1/1632; G06F 1/166; G06F 1/1666; F16B 1/00; F16M 11/105; F16M 11/2021; F16M 11/38; F16M 13/022
See application file for complete search history.

(56) References Cited

U.S. PATENT DOCUMENTS

| | | |
|---|---|---|
| 2015/0083615 A1 | 3/2015 | Lay et al. |
| 2015/0374118 A1 | 12/2015 | van Hooft et al. |

FOREIGN PATENT DOCUMENTS

| | | |
|---|---|---|
| JP | 3182556 U | 4/2013 |
| JP | 2015092317 A | 5/2015 |
| JP | 2016534419 A | 11/2016 |

OTHER PUBLICATIONS

Decision to Grant a Patent issued in corresponding Japanese application No. JP2018-228505 dated Feb. 28, 2019 (4 pages).

*Primary Examiner* — Hoa C Nguyen
*Assistant Examiner* — Keith DePew
(74) *Attorney, Agent, or Firm* — Osha Liang LLP

(57) ABSTRACT

An electronics stand includes a mount on which an electronic device is mounted and a plate member coupled to the mount. The plate member includes: a first plate having a first side connected to the mount and a second side opposite the first side of the first plate; a second plate having a first side foldably connected to the second side of the first plate and a second side opposite the first side of the second plate; a restrictor including a first part foldably connected to the first plate and a second part foldably connected to the first part and the second plate; magnetic materials disposed in the second plate and the second part where at least one of the magnetic materials generates a magnetic force; and a magnetic shield member disposed in the second plate or the second part which includes the magnetic material generating the magnetic force.

5 Claims, 14 Drawing Sheets

ELECTRONICS STAND

CROSS-REFERENCE TO RELATED APPLICATIONS

This application claims priority from Japanese Patent Application No. 2018-228505 filed Dec. 5, 2018, the entire contents of which are incorporated herein by reference.

FIELD

Embodiments described herein relate generally to an electronics stand.

BACKGROUND

Conventionally, electronics stands are known which include a plate member changeable in posture between an expanded form and a folded form. Such an electronics stand includes a cover function in which the expanded plate member covers a display screen of an electronic device such as a tablet personal computer and a stand function in which the folded plate member supports the back side of the electronic device to place the electronic device in standing position at a given angle.

Such an electronics stand may not exert the stand function if the plate member is folded in a wrong direction, for example.

It is thus preferable to provide an electronics stand that can prevent the plate member from being folded in a wrong direction for use.

SUMMARY

According to one embodiment, in general, an electronics stand includes a mount on which an electronic device is mounted, and a plate member coupled to the mount. The plate member includes a first plate having a first side connected to the mount, and a second side opposite the first side; a second plate having a first side foldably connected to the second side of the first plate, and a second side opposite the first side; a restrictor including a first part foldably connected to the first plate, and a second part foldably connected to the first part and to the second plate; a plurality of magnetic materials placed in the second plate and the second part, at least one of the magnetic materials that generates a magnetic force; and a magnetic shield member placed in either of the second plate and the second part which includes the magnetic material that generates the magnetic force. The plate member is changeable in posture between an expanded form and a folded form. The expanded form is a form in which the first plate, the second plate, and the restrictor are expanded. The folded form is a form in which the second plate is folded with respect to the first plate and placed on the second part such that the second side of the second plate supports a back face of the electronic device, the magnetic material of the second plate and the magnetic material of the second part are juxtaposed and coupled together by the magnetic force in a direction in which the second plate is placed on the second part, and the restrictor limits folding of the second plate with respect to the first plate. In the folded form, the magnetic shield member is located outside at least either of the magnetic material of the second plate and the magnetic material of the second part that generates the magnetic force, in the direction in which the second plate is placed on the second part, to weaken the magnetic force of the magnetic material toward the outside.

DETAILED DESCRIPTION

Figure 1:
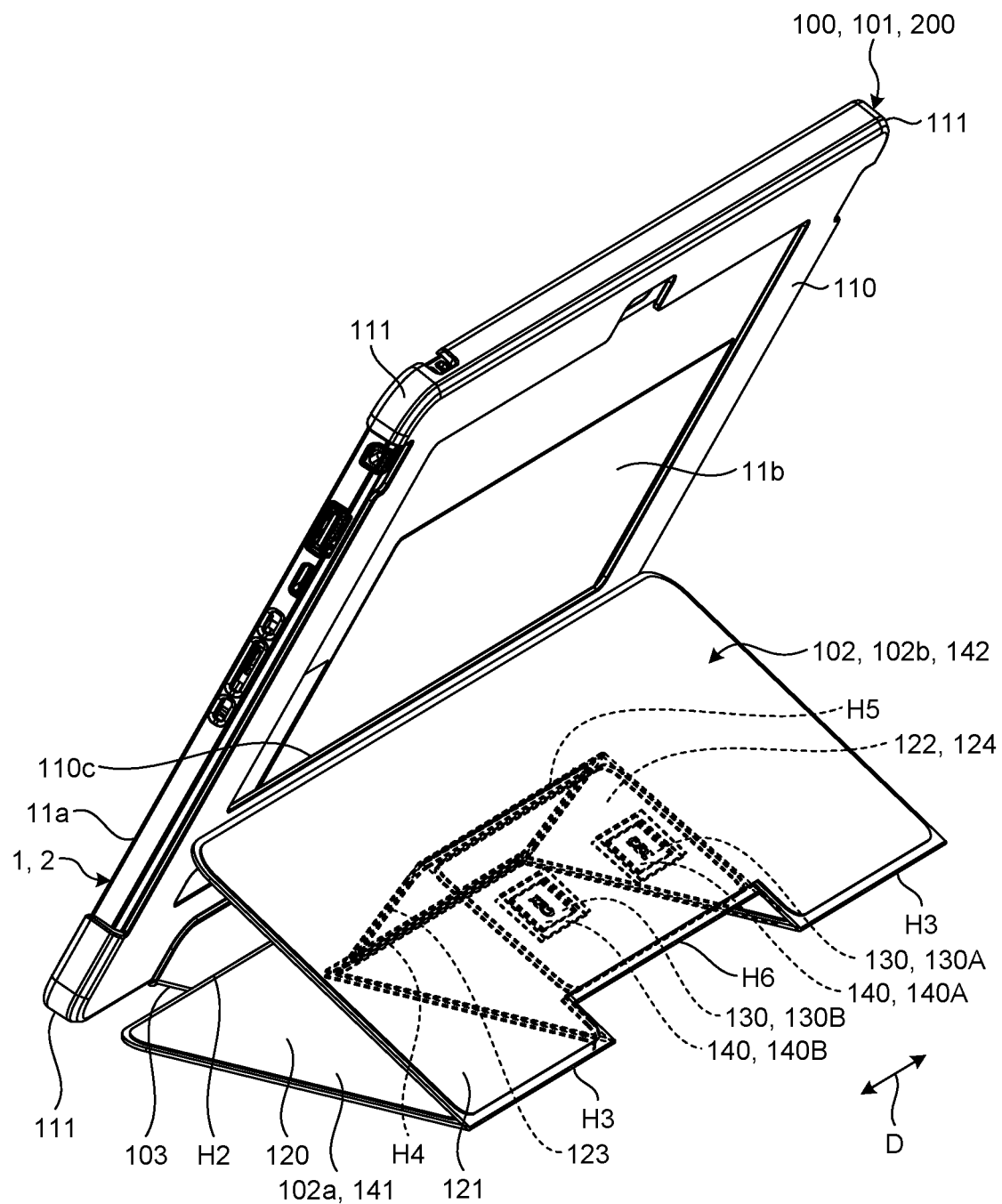
FIG. 1 is an exemplary perspective view of an electronics stand according to a first embodiment, while a folded plate member supports an electronic device.

The following discloses exemplary embodiments. Configurations of the following embodiments and operations and effects achieved by the configurations are merely exemplary. The embodiments can be implemented by any configuration other than the configurations disclosed in the following embodiments. The embodiments can attain at least one of a variety of effects (including derivative effects) achieved by the configurations.

The following embodiments include same or similar elements. Such elements are denoted by the same reference numerals throughout the embodiments and overlapping descriptions thereof are omitted. In this disclosure, ordinal numbers are used only for distinguishing components, parts, members, portions, positions, directions, and the like and are unintended to indicate any order or priority.

First Embodiment

Figure 2:
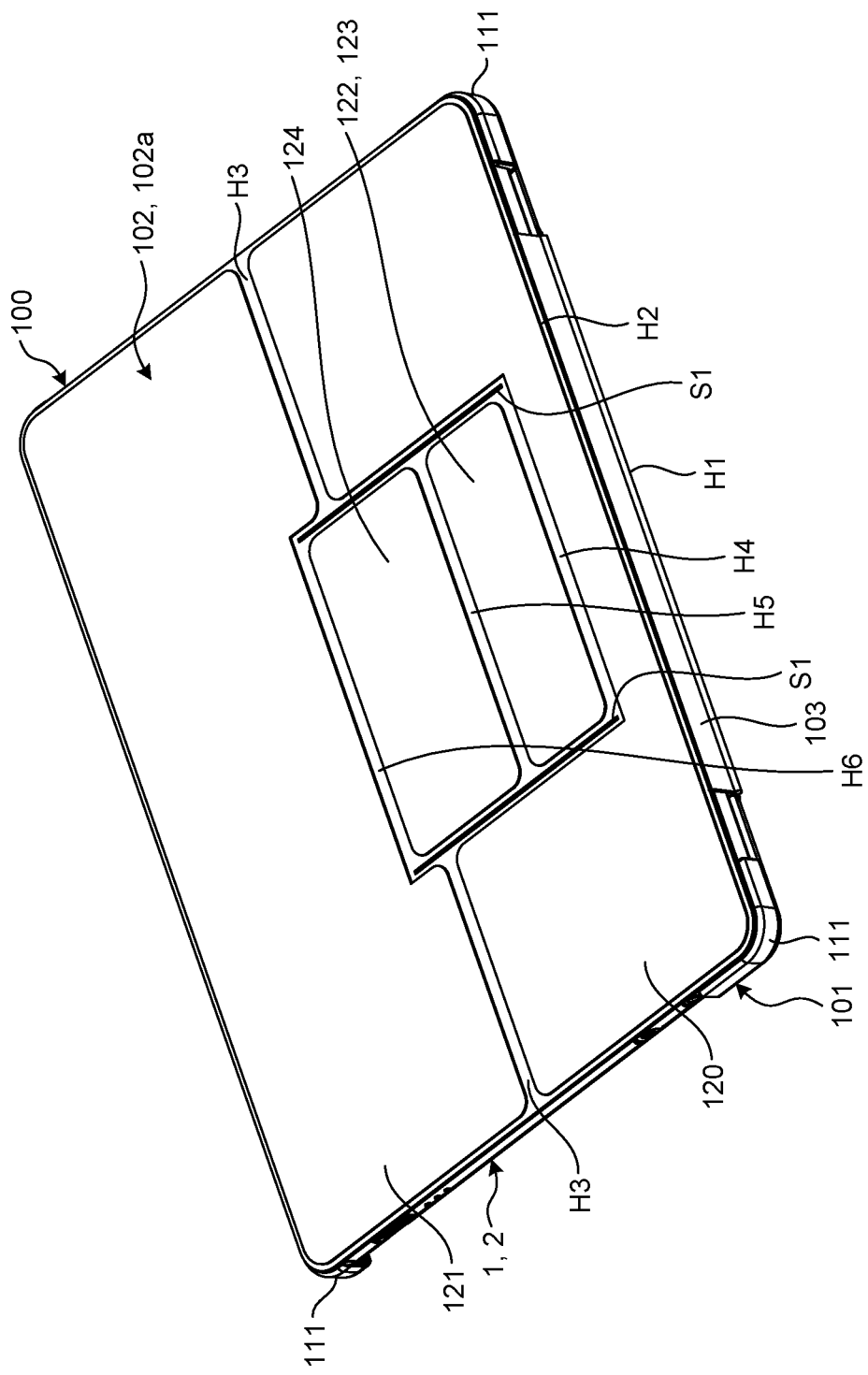
FIG. 2 is an exemplary perspective view of the electronics stand in the first embodiment, while an expanded plate member covers a front face of the electronic device.

FIG. 1 is an exemplary perspective view of an electronics stand 100 according to the embodiment, while a plate member 102 is folded to support an electronic device 1. FIG. 2 is an exemplary perspective view of the electronics stand 100 in the embodiment, while the plate member 102 is expanded to cover the front face of the electronic device 1.

[0011] As illustrated in FIGS. 1 and 2, the electronics stand 100 includes a mount 101, the plate member 102, and a connector 103. The electronic device 1 is mounted on the mount 101. The connector 103 connects the mount 101 and the plate member 102. The plate member 102 is changeable in posture between a folded form (FIG. 1) and an expanded form (FIG. 2). The electronics stand 100 includes a stand function (FIG. 1) and a cover function (FIG. 2). In the stand function, the folded plate member 102 works to stand the electronic device 1 on the mount surface at a given angle relative to the mount surface. In the cover function, the expanded plate member 102 serves to cover a front face 11a of the electronic device 1. The folded form is also referred to as a folded posture. The expanded form is also referred to as an expanded posture. The electronics stand 100 is also referred to as electronics cover stand.

Figure 3:
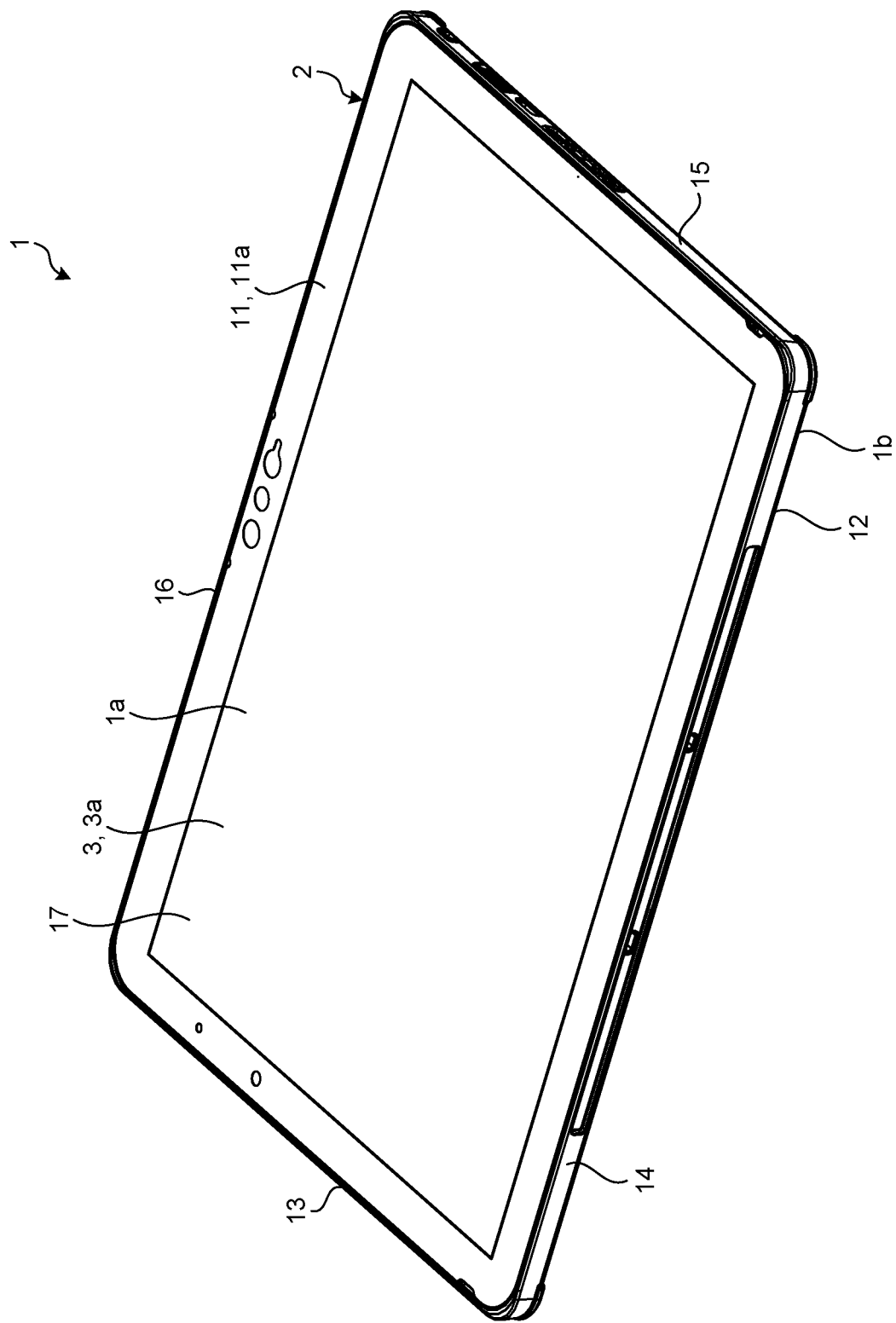
FIG. 3 is an exemplary perspective view of the electronic device in the first embodiment.

FIG. 3 is an exemplary perspective view of the electronic device 1 in the embodiment. As illustrated in FIG. 3, the electronic device 1 represents, for example, a tablet personal computer. The electronic device 1 is not limited to such an example and may be, for example, a video display, a television receiver, a gaming machine, a video display controller, and an information storage.

In the following, with reference to the electronic device 1 in a standing or upright position held by the electronics stand 100 (FIG. 1) as viewed from a user of the electronic device 1, a side closer to the user is referred to as a front side (anterior) and a side remote from the user is referred to as a rear side (posterior). A height direction of the electronic device 1 is also referred to as a vertical direction and a width direction of the electronic device 1 is also referred to as a crosswise direction D.

The electronic device 1 has a front face 1a being an anterior face and a back face 1b being a posterior face. The electronic device 1 includes a housing 2. The housing 2 houses a display unit 3 and other components such as a wireless communication device.

The housing 2 has a flat, substantially parallelepiped box shape. The housing 2 has a front wall 11 to which a display screen 3a of the display unit 3 is exposed, a back wall 12 opposite the front wall 11, and a plurality of side walls 13 to 16 extending between the front wall 11 and the back wall 12.

The front wall 11 has a quadrilateral shape, specifically, a rectangular shape in a front view. The front face 11a of the front wall 11 and the display screen 3a are covered by a transparent member 17. The front face of the transparent member 17 serves as the front face 1a of the electronic device 1. The back wall 12 has a quadrilateral shape, specifically, a rectangular shape in a front view. The back face of the back wall 12 serves as the back face 1b of the electronic device 1.

Figure 4:
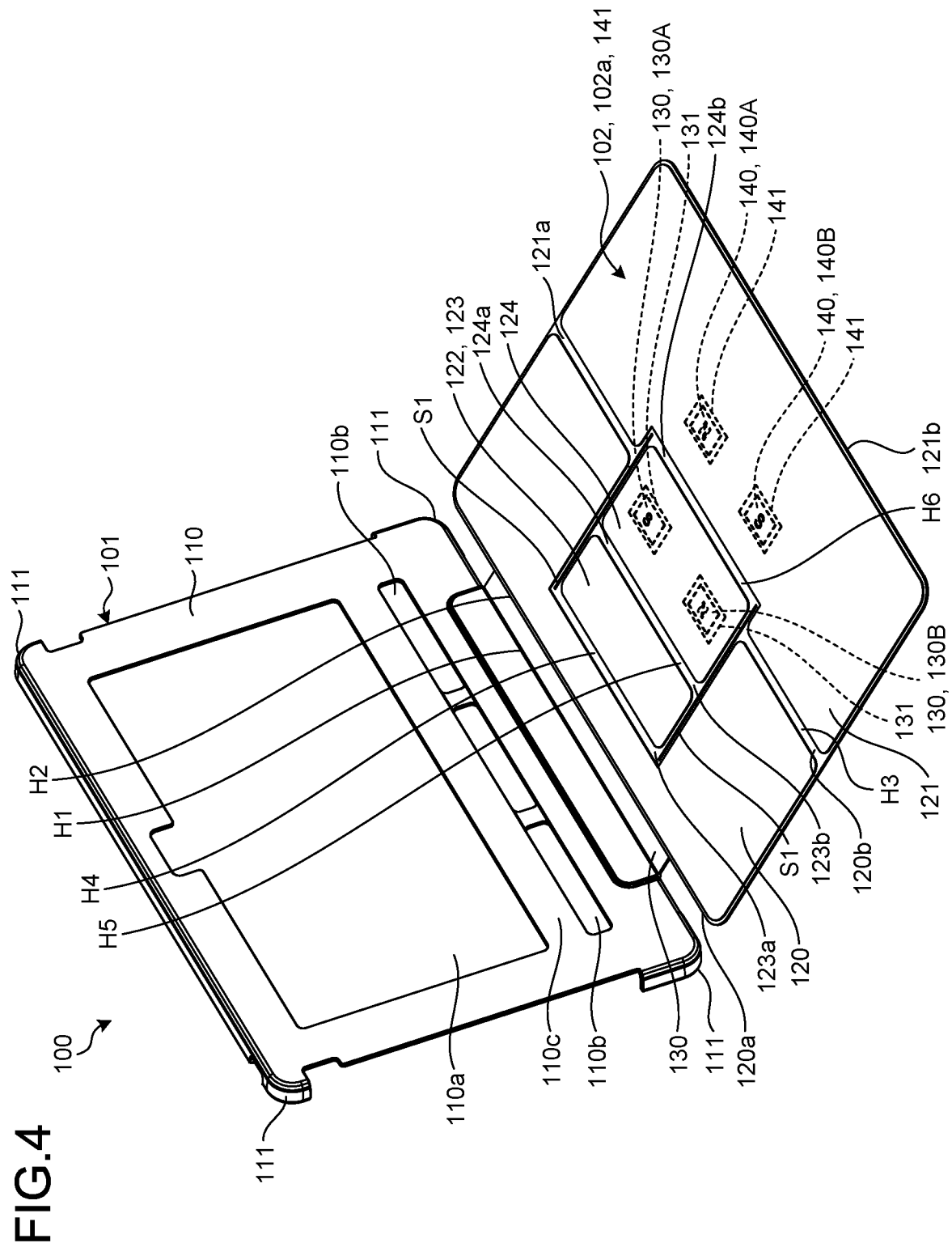
FIG. 4 is an exemplary perspective view of the electronics stand in the first embodiment, while the expanded plate member is away from a mount.

The following describes the electronics stand 100 in detail. FIG. 4 is an exemplary perspective view of the electronics stand 100 in the embodiment, while the expanded plate member 102 is separated from the mount 101.

As illustrated in FIG. 4, the mount 101 includes a wall 110 and four corner supports 111. The wall 110 has a quadrilateral shape, specifically, a rectangular shape in a front view.

The wall 110 is provided with an opening 110a and a plurality of openings 110b. The opening 110a and the openings 110b pass through the wall 110 along the thickness. The openings 110b are located below the opening 110a and aligned with spacing in the crosswise direction D. A part of the wall 110 between the opening 110a and the openings 110b serves as an extension 110c extending in the crosswise direction D.

The corner supports 111 are disposed at the four respective corners of the wall 110. The corner supports 111 extend forward from the wall 110. The two top corner supports 111 are integrated together. The two bottom corner supports 111 are integrated together.

The electronic device 1 is removably mounted on the mount 101 as configured above. While the electronic device 1 is mounted on the mount 101, the wall 110 contacts and supports the back face 1b of the electronic device 1 and the four corner supports 111 contact and support the four corners of the electronic device 1. The mount 101 and the electronic device 1 mounted thereon form an assembly 200.

The connector 103 extends between a lower side of the mount 101 and a first (lower) side 120a of the plate member 102. The connector 103 is foldably connected to the lower side of the mount 101 with a hinge H1 which extends in the crosswise direction D, and is foldably connected to the first side 120a of the plate member 102 with a hinge H2 which extends in the crosswise direction D. The connector 103 connects the plate member 102 to the mount 101 such that the plate member 102 is foldable to the front side and the back side of the mount 101.

Figure 5:
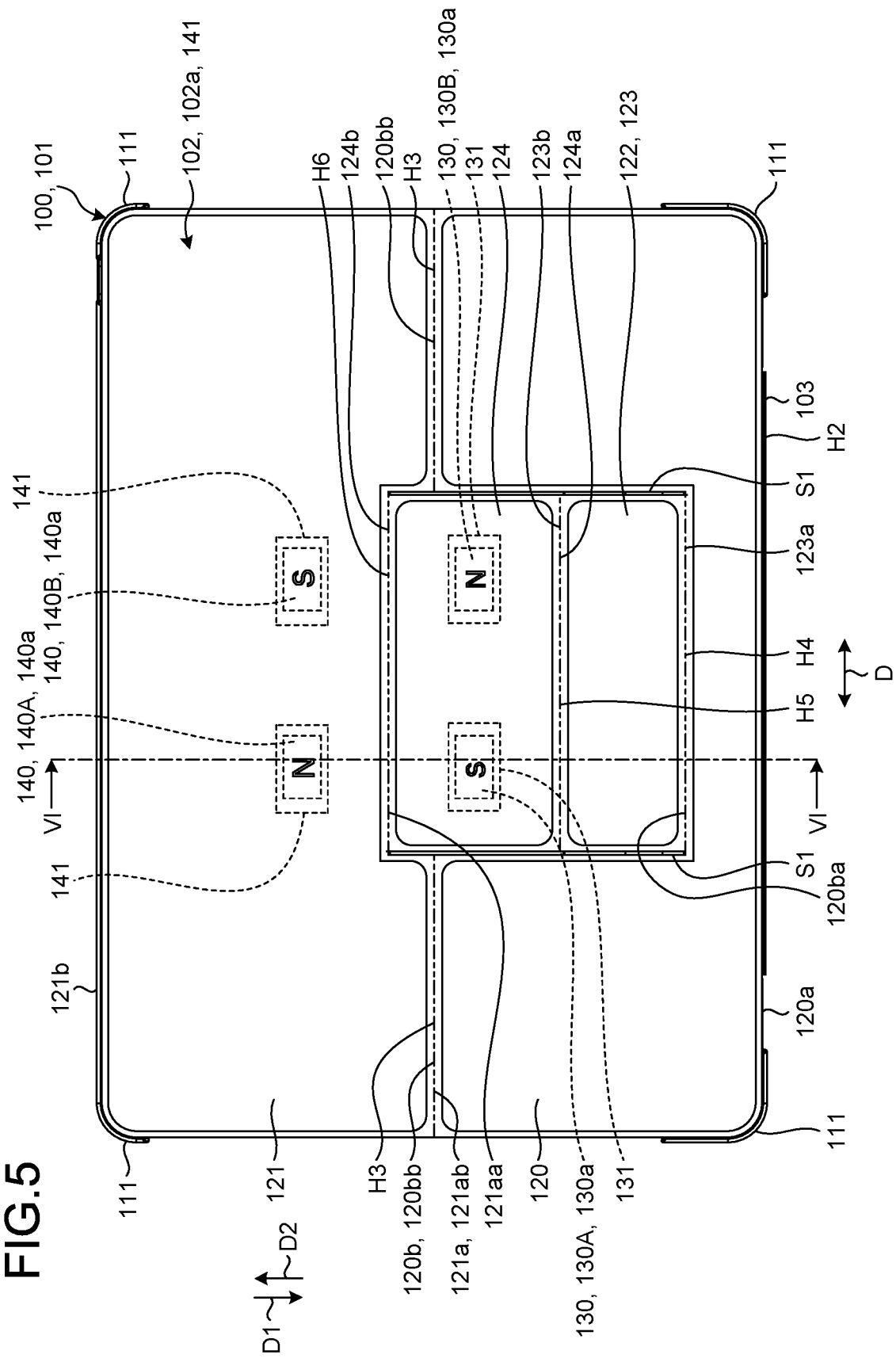
FIG. 5 is an exemplary plan view of the electronics stand in the first embodiment, while the expanded plate member and the mount are placed on top of each other.
Figure 6:
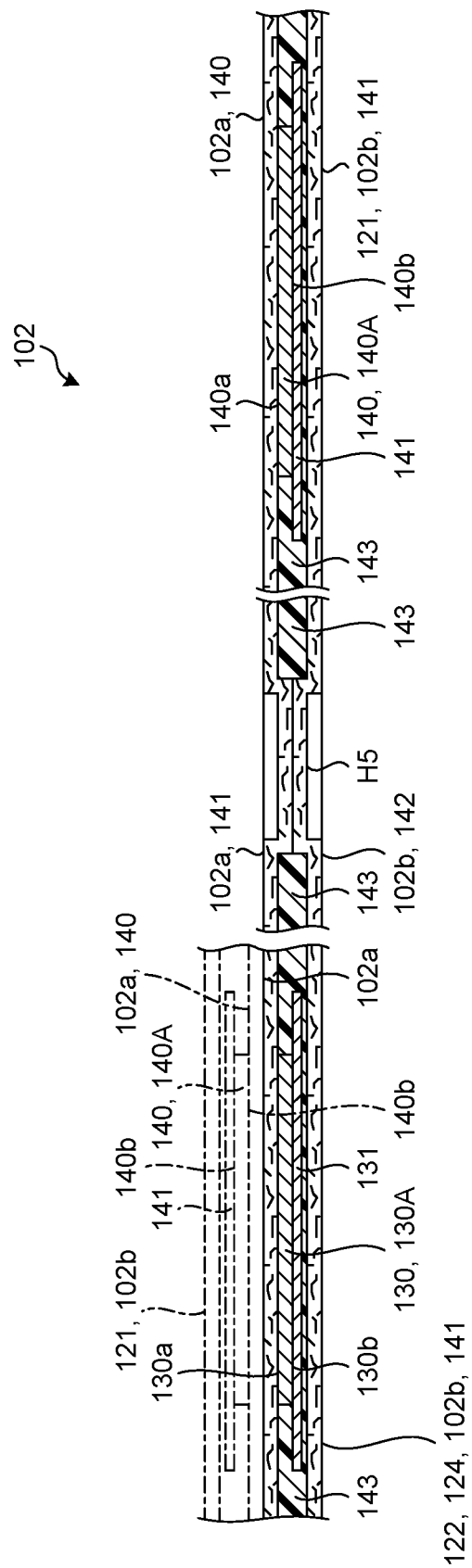
FIG. 6 is a partial cross-sectional view taken along the line VI-VI in FIG. 5.
Figure 7:
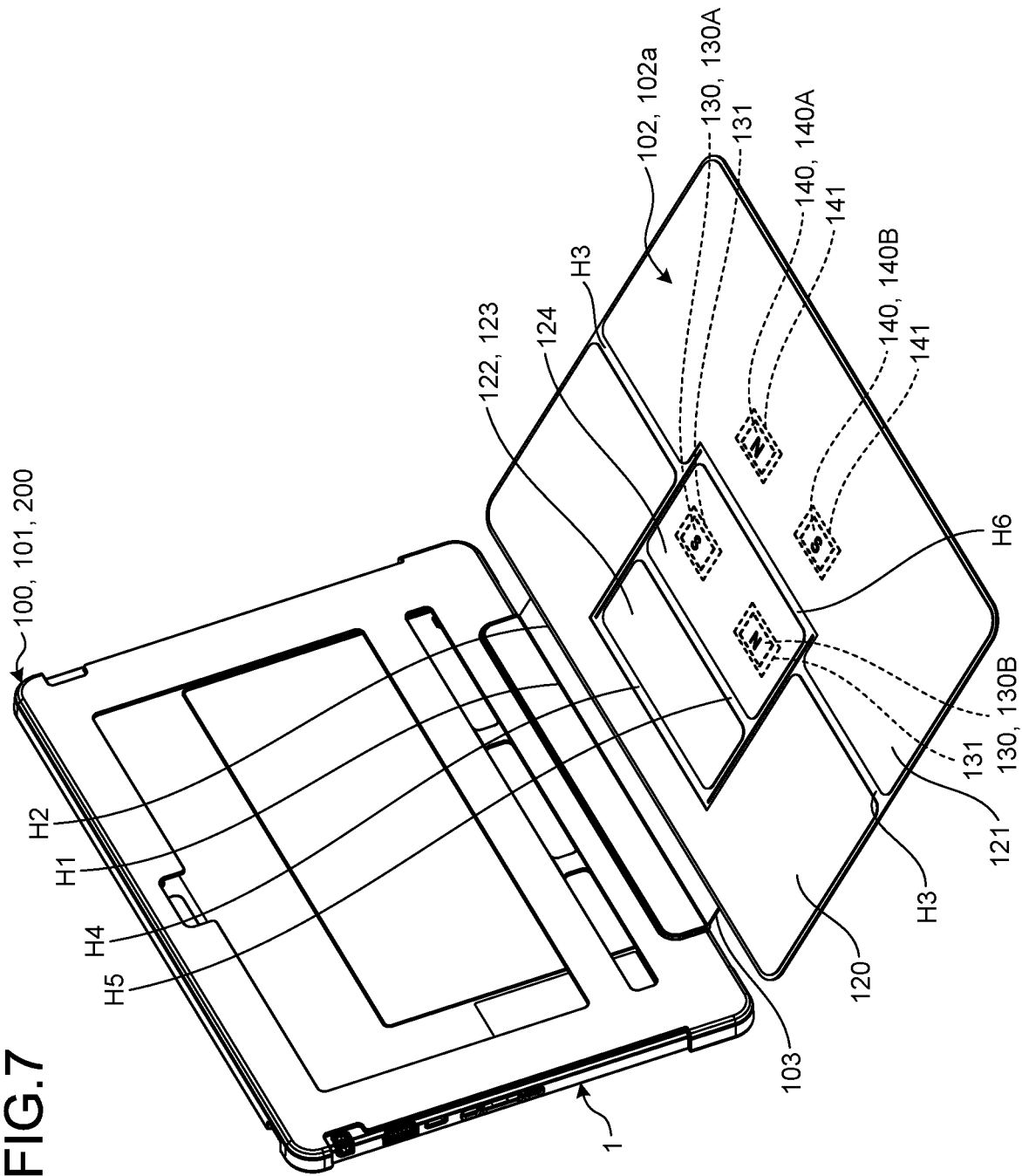
FIG. 7 is an exemplary perspective view of the electronics stand in the first embodiment, while the electronic device is mounted on the mount and the expanded plate member is away from the mount.
Figure 8:
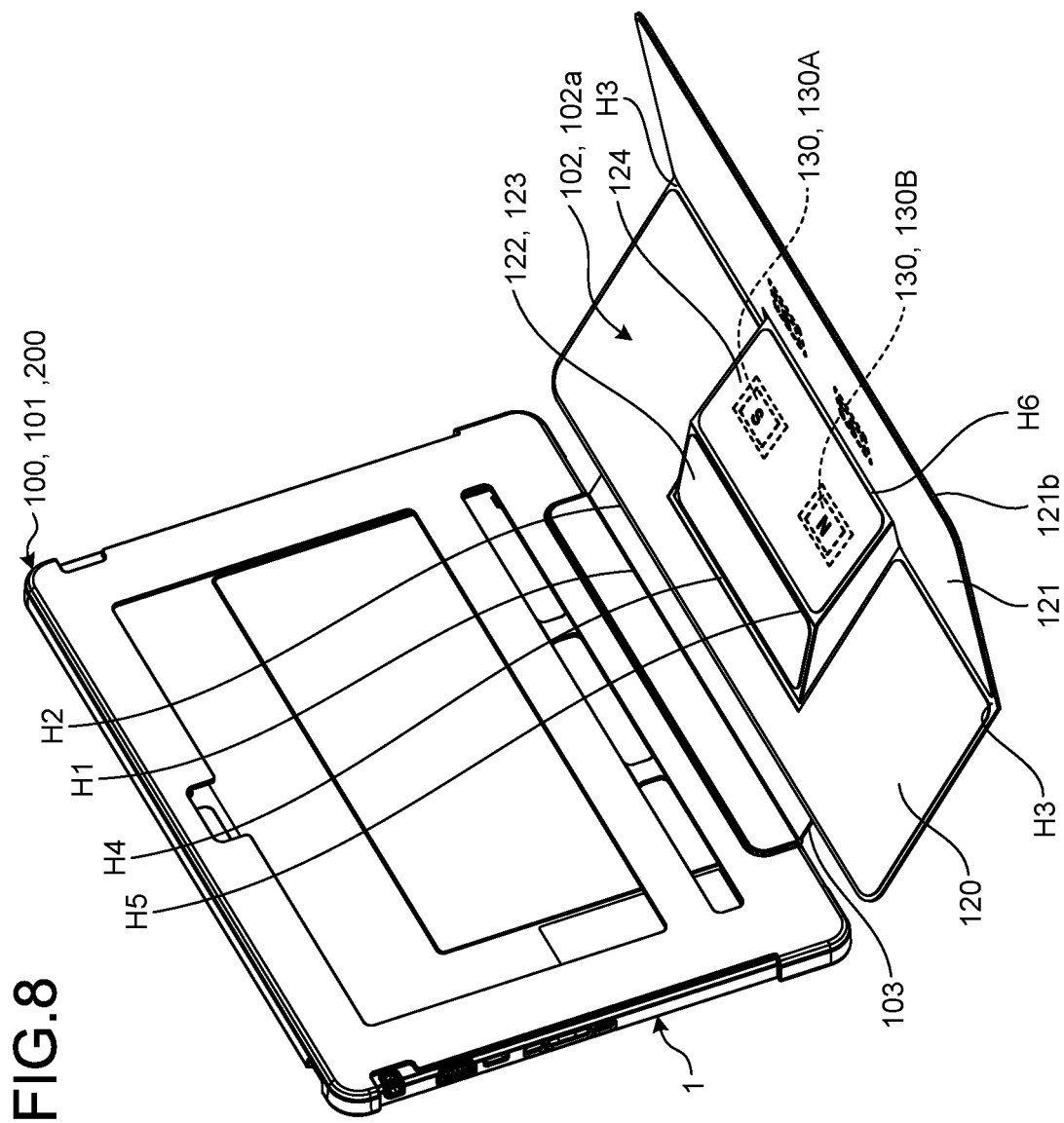
FIG. 8 is an exemplary perspective view of the electronics stand in the first embodiment, while the electronic device is mounted on the mount and a partially folded plate member is away from the mount.

FIG. 5 is an exemplary perspective view of the electronics stand 100 in the first embodiment, while the plate member 102 is expanded and placed on the mount 101. FIG. 6 is a partial cross-sectional view taken along the line VI-VI in FIG. 5. In FIG. 6 a second plate 121 indicated by the dash-single-dot line is in the folded form. FIG. 7 is an exemplary perspective view of the electronics stand 100 in the first embodiment, while the electronic device 1 is mounted on the mount 101 and the plate member 102 is expanded away from the mount 101. FIG. 8 is an exemplary perspective view of the electronics stand 100 in the first embodiment, while the electronic device 1 is mounted on the mount 101 and a partially folded plate member 102 is away from the mount 101.

As illustrated in FIGS. 4 to 8, the plate member 102 has a first face 102a and a second face 102b opposite the first face 102a.

The plate member 102 includes a first plate 120, a second plate 121, a restrictor 122, a plurality of magnets 130 and 140, and a plurality of magnetic shield members 131 and 141.

Referring to FIG. 5, the first plate 120 has the first side 120a and a second side 120b opposite the first side 120a. The first side 120a of the first plate 120 is closer to the connector 103 and extends in the crosswise direction D. The first side 120a is foldably connected to the connector 103 with the hinge H2. The second side 120b includes a first part 120ba and two second parts 120bb. The two second parts 120bb are located anterior to the first part 120ba in a direction D2 from the first side 120a to the second side 120b. The first part 120ba is located between the two second parts 120bb. The first part 120ba and the two second parts 120bb each extend in the crosswise direction D. That is, the second side 120b extends in the crosswise direction D.

The second plate 121 has a first side 121a and a second side 121b opposite the first side 121a. The first side 121a includes a first part 121aa and two second parts 121ab. The two second parts 121*ab* are located anterior to the first part 121*aa* in a direction D1 from the second side 121*b* to the first side 121*a*. The first part 121*aa* is located between the two second parts 121*ab*. The first part 121*aa* and the two second parts 121*ab* each extend in the crosswise direction D. That is, the first side 121*a* extends in the crosswise direction D. The two second parts 121*ab* are foldably connected to the two respective second parts 120*bb* of the second side 120*b* of the first plate 120 with a hinge H3.

While the second plate 121 configured as above is folded with respect to the first plate 120 such that the first face 102*a* of the second plate 121 faces the first face 102*a* of the first plate 120, the second side 121*b* supports a back face 11*b* of the electronic device 1 (FIG. 1). The second side 121*b* abuts on the extension 110*c* of the mount 101.

As illustrated in FIG. 5, the restrictor 122 has a plate shape and includes a first part 123 and a second part 124. The restrictor 122 restricts or regulates the second plate 121 from being folded with respect to the first plate 120 so as to prevent the angle between the first plate 120 and the second plate 121 from lowering below a given angle. Specifically, the restrictor 122 maintains the angle between the first plate 120 and the second plate 121 at a given angle. The restrictor 122 is also referred to as a regulator.

The first part 123 has a first side 123*a* and a second side 123*b* opposite the first side 123*a*. The first side 123*a* is foldably connected to the first part 120*ba* of the second side 120*b* of the first plate 120 with a hinge H4. The first side 123*a* and the second side 123*b* extend in the crosswise direction D.

The second part 124 has a first side 124*a* and a second side 124*b* opposite the first side 124*a*. The first side 124*a* is foldably connected to the second side 123*b* of the first part 123 with a hinge H5. The second side 124*b* is foldably connected to the first part 121*aa* of the first side 121*a* of the second plate 121 with a hinge H6. The first side 124*a* and the second side 124*b* extend in the crosswise direction D. In the expanded state of the plate member 102A, a slit S1 lies on both lateral sides of the restrictor 122. The first part 123 and the second part 124 are also referred to as plates.

In the folded form of the plate member 102 (FIG. 1), the second part 124 and the second plate 121 are placed on top of each other, with a first face 102*a* of the second part 124 of the restrictor 122 in contact with a first face 102*a* of the second plate 121, and the first part 123 stretching between the first plate 120 and the second plate 121. Thereby, the restrictor 122 restricts the folding of the second plate 121 with respect to the first plate 120.

Referring to FIG. 6, the plate member 102 includes a core material 143 and a cover member 142 covering the core material 143. The core material 143 is formed of, for example, a synthetic resin material. The cover member 142 is formed of, for example, leather or synthetic leather (artificial leather). The hinges H1 to H6 are each formed of the cover member 142 without the core material 143. Thus, the hinges H1 to H6 are elastically foldable, and when folded, generate an elastic force as resilience.

The plate member 102 as configured above is changeable in posture between the expanded form (FIG. 2) and the folded form (FIG. 1), as described above. In the expanded form (FIG. 2), the first plate 120, the second plate 121, and the restrictor 122 are expanded.

In the folded form (FIG. 1), the second plate 121 is folded with respect to the first plate 120 and placed on the second part 124 such that the second side 121*b* of the second plate 121 supports the back face 1*b* of the electronic device 1, and the restrictor 122 limits the folding of the second plate 121 with respect to the first plate 120.

To change the posture of the plate member 102 from the expanded form in FIG. 2 to the folded form in FIG. 1, the user folds the plate member 102 toward the back face of the mount 101 on which the electronic device 1 is mounted (FIG. 7). The user then folds the second plate 121 so that the second side 121*b* of the second plate 121 approaches the back face 200*b* of the electronic device 1. Through such folding, the first part 123 and the second part 124 of the restrictor 122 are folded, placing the plate member 102 in the folded state (FIG. 1).

The following describes the magnets 130 and 140 and the magnetic shield members 131 and 141. As illustrated in FIGS. 5 and 6, the second part 124 of the restrictor 122 and the second plate 121 are provided with the magnets 130 and 140. The magnets 130 and 140 are an exemplary magnetic material that generates a magnetic force.

The second part 124 are provided with two magnets 130 aligned with spacing in the crosswise direction D. In the following, to differentiate the two magnets 130, the magnets 130 are referred to as magnets 130A and 130B. The magnet 130B is located on the right side of the magnet 130A.

The magnets 130 each have a first face 130*a* and a second face 130*b*. The first face 130*a* is on the side of the first face 102*a* of the second part 124 (plate member 102). The second face 130*b* is opposite to the first face 130*a*, i.e., on the side of the second face 102*b* of the second part 124 (plate member 102). The first face 130*a* of the magnet 130A has an S-pole while the first face 130*a* of the magnet 130B has an N-pole. That is, the two adjacent magnets 130A and 130B juxtaposed in the crosswise direction D have different magnetic poles. The crosswise direction D is an exemplary first direction.

The magnetic shield member 131 is placed on the second face 130*b* of the magnet 130 in the second part 124. The magnetic shield member 131 covers the entire second face 130*b*. The magnetic shield member 131 is formed of a magnetic material such as iron or tinplate. The magnetic shield member 131 is not magnetized. The magnetic shield member 131 functions as a yoke that enhances a magnetic force of the first face 130*a* of the magnet 130 and weakens the magnetic force of the second face 130*b* of the magnet 130. The magnetic shield member 131 may be magnetized if it can function to strengthen the magnetic force of the first face 130*a* of the magnet 130 and weaken the magnetic force of the second face 130*b* of the magnet 130.

Two magnets 140 are juxtaposed with spacing in the second plate 121 in the crosswise direction D. In the following, to differentiate the two magnets 140, the magnets 140 are referred to as magnets 140A and 140B. The magnet 140B is located on the right side of the magnet 140A. In the folded form, the magnets 140A and 140B and the magnets 130A and 130B are aligned in a direction in which the second plate 121 and the second part 124 are placed on top of each other, that is, along the thickness of the second plate 121 and the second part 124.

The magnets 140 each have a first face 140*a* and a second face 140*b*. The first face 140*a* is on the side of the first face 102*a* of the second plate 121 (plate member 102). The second face 140*b* is opposite to the first face 140*a*, i.e., on the side of the second face 102*b* of the second plate 121 (plate member 102). The first face 130*a* of the magnet 140A has an N-pole and the first face 130*a* of the magnet 140B has an S-pole. That is, the two adjacent magnets 140A and 140B juxtaposed in the crosswise direction D have different magnetic poles.

The magnetic shield member 141 is placed on the second face 140b of the magnet 140 in the second plate 121. The magnetic shield member 141 covers the entire second face 140b. The magnetic shield member 141 is formed of a magnetic material such as iron or tinplate. The magnetic shield member 141 is not magnetized. The magnetic shield member 141 functions as a yoke that enhances the magnetic force of the first face 140a of the magnet 140 and weakens the magnetic force of the second face 130b of the magnet 140.

As configured above, in the folded form, the magnets 140A and 140B on the second plate 121 and the magnets 130A and 130B on the second part 124 are aligned in the direction in which the second plate 121 and the second part 124 are placed on top of each other, and are coupled together by their magnetic force. The magnetic shield members 131 and 141 are located outside the magnets 130 and 140 in the overlapping direction of the second plate 121 and the second part 124 (FIG. 6), to weaken the magnetic force of the magnets 130 and 140 toward the outside.

In addition, in the folded form, the magnets 140 on the second plate 121 and the magnets 130 on the second part 124 are coupled together by the magnetic force against the elastic forces occurring from the elastic deformation of the hinges H1 to H6 of the plate member 102. Thus, in the folded form, the magnets 130 and 140 exert greater magnetic forces than the elastic force occurring from the elastic deformation of the hinges H1 to H6 of the plate member 102.

As described above, according to the present embodiment, the plate member 102 of the electronics stand 100 are changeable in posture between the expanded form and the folded form. In the expanded form the first plate 120, the second plate 121, and the restrictor 122 are expanded. In the folded form, the second plate 121 is folded with respect to the first plate 120 and placed on the second part 124 such that the second side 121b of the second plate 121 supports the back face 1b of the electronic device 1, the magnets 140 (magnetic materials) in the second plate 121 and the magnets 130 (magnetic materials) in the second part 124 are juxtaposed in the overlapping direction of the second plate 121 and the second part 124 and coupled together by the magnetic force, and the restrictor 122 restricts the folding of the second plate 121 with respect to the first plate 120. The magnetic shield members 131 and 141 are located outside the magnets 140 in the second plate 121 and the magnets 130 in the second part 124 in the direction in which the second plate 121 is placed on the second part 124, to thereby weaken the magnetic forces of the magnets 130 and 140 toward the outside.

With such configurations, when the user folds the second plate 121 and the second part 124 in the correct direction (FIG. 1), for example, the magnetic shield members 131 and 141 are located outside the area between the magnets 140 in the second plate 121 and the magnets 130 in the second part 124, which prevents the magnetic shield members 131 and 141 from weakening the magnetic coupling forces of the magnets 140 in the second plate 121 and the magnets 130 in the second part 124. Meanwhile, if the user folds the second plate 121 and the second part 124 in the wrong direction opposite the correct direction (FIG. 1), the magnetic shield members 131 and 141 are placed between the magnets 140 in the second plate 121 and the magnets 130 in the second part 124, so that the magnetic shield members 131 and 141 weaken the magnetic coupling forces of the magnets 140 in the second plate 121 and the magnets 130 in the second part 124. This makes it easier for the user to recognize folding of the second plate 121 and the second part 124 in the wrong direction. The plate member 102 can thus be prevented from being folded in the wrong direction for use.

In addition, in the first embodiment, while a second face 102b of the second plate 121 and a second face 102b of the second part 124 are placed on top of each other, the elastic force of the elastically deformed plate member 102 is greater than the magnetic coupling force of the magnets 130 and 140. Thus, in the case of erroneous placement of the second face 102b of the second plate 121 on the second face 102b of the second part 124, the elastic force of the elastically deformed plate member 102 works to move the second plate 121 and the second part 124 away from each other. This can prevent the plate member 102 from being folded in the wrong direction for use.

Additionally, in the first embodiment, the plate member 102 elastically deforms from the expanded form to the folded form, for example. In the folded form, the magnets 140 in the second plate 121 and the magnets 130 in the second part 124 are coupled together by their own magnetic forces against the elastic force of the elastically deformed plate member 102.

With such configuration, when the second plate 121 and the second part 124 are folded in the correct direction, for example, the second plate 121 and the second part 124 are attracted to each other by the magnetic coupling forces of the magnets 140 in the second plate 121 and the magnets 130 in the second part 124 during the folding process. This action works to facilitate the folding of the second plate 121 and the second part 124. Meanwhile, if the second plate 121 and the second part 124 are folded in the wrong direction to place the magnetic shield members 131 and 141 between the second plate 121 and the second part 124, the magnetic force acting on the area between the magnets 140 in the second plate 121 and the magnets 140 in the second part 124 is smaller than the elastic force of the elastically deformed plate member 102. This makes it easier for the user to recognize folding of the second plate 121 and the second part 124 in the wrong direction.

Further, in the first embodiment, for example, at least either (both, as an example) of the second plate 121 and the second part 124 is provided with the magnets 130 and 140 juxtaposed with each other in the crosswise direction D (first direction) along the first side 120a to generate magnetic forces.

Such configuration leads to reduce the electronics stand 100 in weight, as compared with use of a single magnet with a width equivalent to a crosswise width of the row of the magnets 130 and 140 generating magnetic forces.

In the first embodiment, for example, the two adjacent magnets 130 and 140 aligned in the crosswise direction D to generate magnetic forces have different magnetic poles.

With such configuration, the overall magnetic force of the crosswise aligned magnets 130 and 140 can be increased, as compared with two adjacent magnets with the same pole aligned in the crosswise direction D.

In the first embodiment, for example, the mount 101 has the wall 110 which covers at least part of the back face 1b of the electronic device 1, and the second side 121b of the second plate 121 contacts the wall 110 in the folded form.

With such configuration, for example, the folding angle of the second plate 121 with respect to the mount 101 can be more accurately set than the second side 121b of the second plate 121 contacting the back face 1b of the electronic device 1.

Other Embodiments

The following describes second to seventh embodiments referring to FIGS. 9 to 14. Electronics stands in the second to seventh embodiments have configurations similar to the configuration of the electronics stand 100 in the first embodiment. Thus, the second to seventh embodiments achieve results (effects) similar to the results (effects) based on the configurations of the first embodiment. The following mainly describes differences between the electronics stands 100 in the second to seventh embodiments and the electronics stand 100 in the first embodiment.

Second Embodiment

Figure 9:
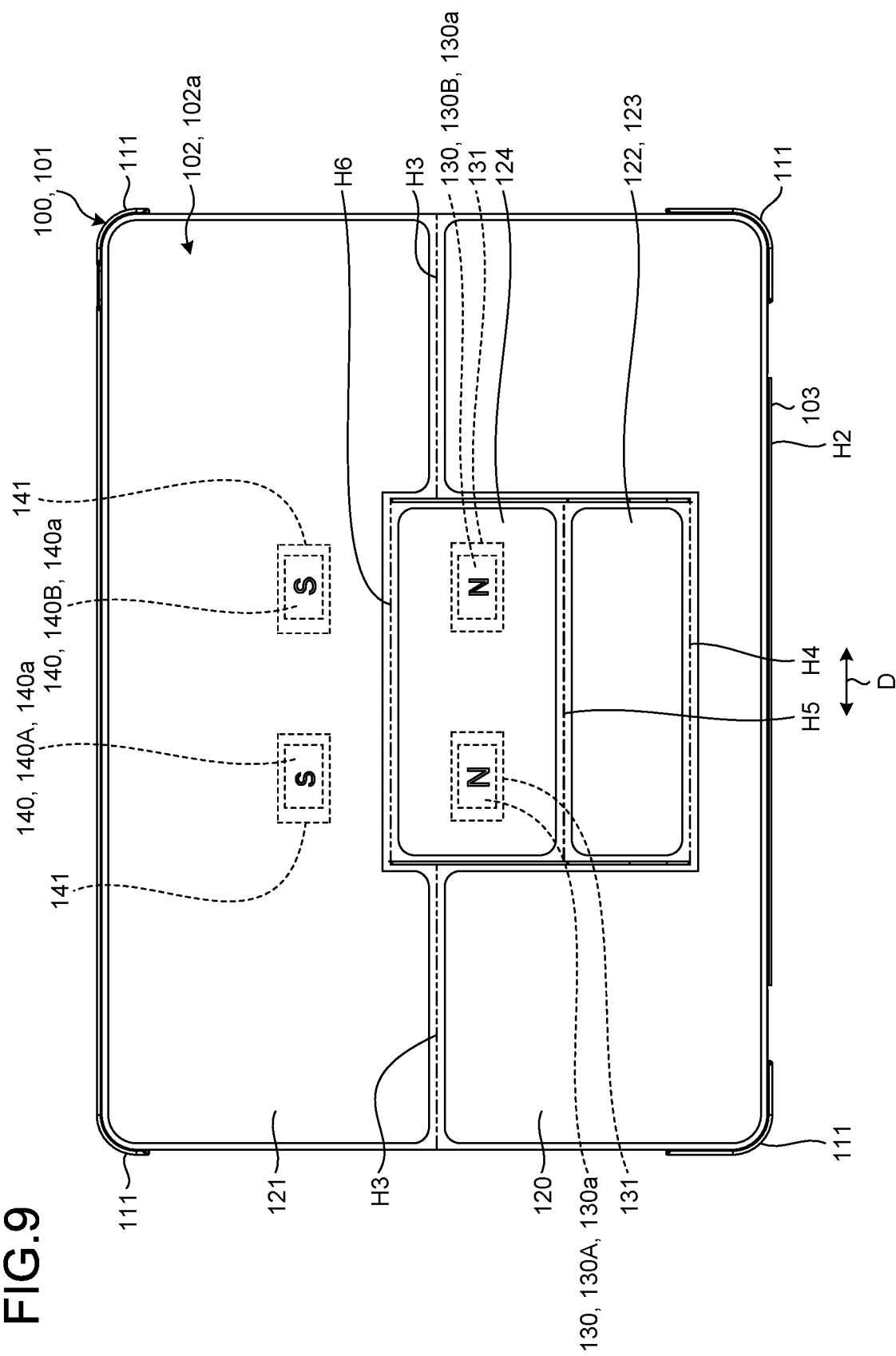
FIG. 9 is an exemplary plan view of an electronics stand in a second embodiment, while an expanded plate member and a mount are placed on top of each other.

FIG. 9 is an exemplary plan view of the electronics stand 100 in the second embodiment, while the plate member 102 is expanded and placed on the mount 101.

In the second embodiment, the first faces 130a of the magnet 130A and the magnet 130B both have an N-pole. That is, the two adjacent magnets 130A and 130B aligned in the crosswise direction D have the same magnetic pole.

The first faces 140a of the magnet 140A and the magnet 140B both have an S-pole. That is, the two adjacent magnets 140A and 140B aligned in the crosswise direction D have the same magnetic pole.

Third Embodiment

Figure 10:
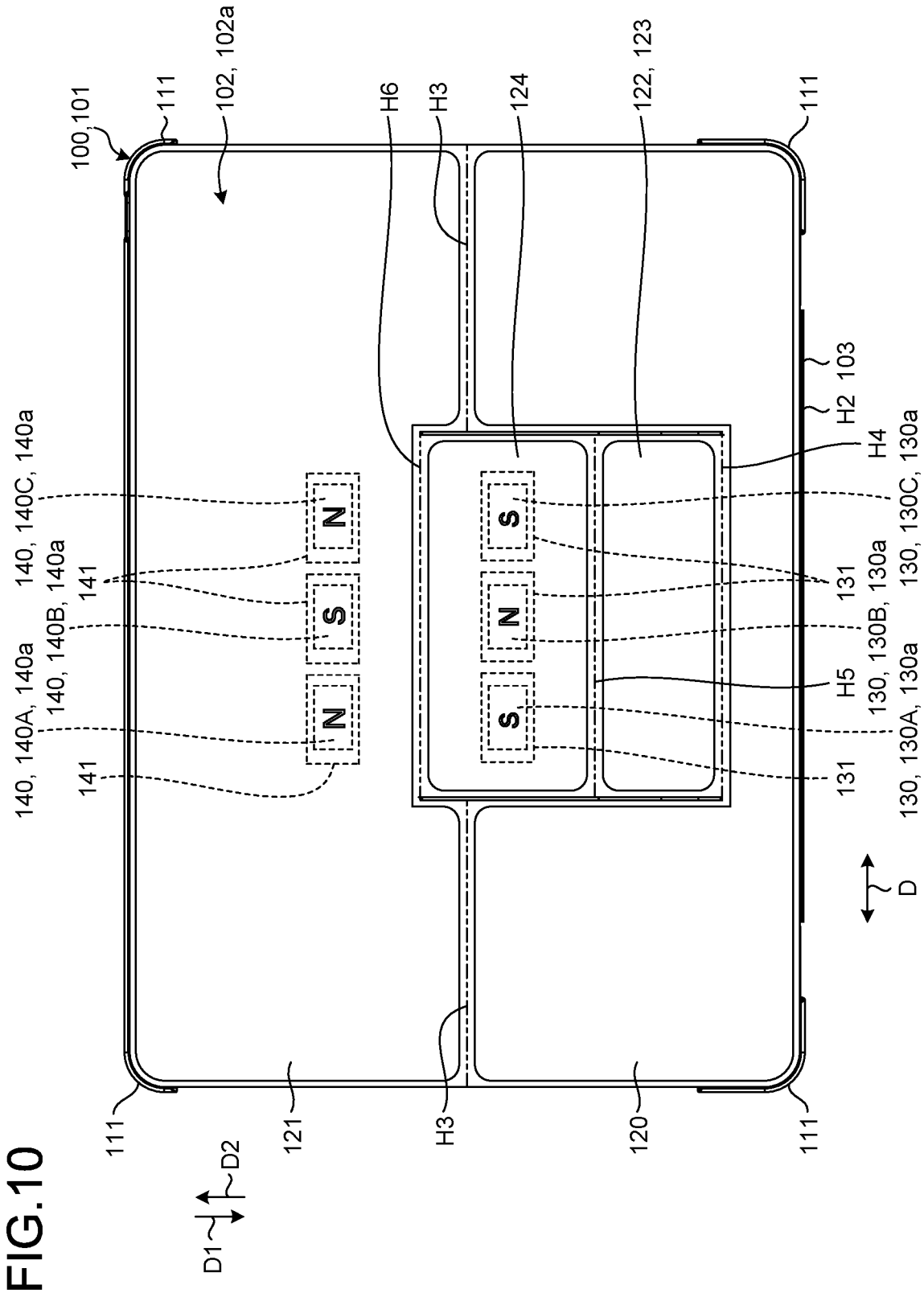
FIG. 10 is an exemplary plan view of an electronics stand in a third embodiment, while an expanded plate member and a mount are placed on top of each other.

FIG. 10 is an exemplary plan view of the electronics stand 100 in the third embodiment, while the plate member 102 is expanded and placed on the mount 101.

In the third embodiment, a magnet 130C is placed in the second part 124 in addition to the magnets 130A and 130B. The magnet 130C is located on the right side of the magnet 130B. A first face 130a of the magnet 130C has an S-pole. Specifically, every two adjacent magnets 130A, 130B, and 130C aligned in the crosswise direction D have different magnetic poles.

Additionally, a magnet 140C is placed in the second plate 121 in addition to the magnets 140A and 140B. The magnet 140C is located on the right side of the magnet 140B. A first face 140a of the magnet 140C has an N-pole. Specifically, every two adjacent magnets 140A, 140B, and 140C aligned in the crosswise direction D have different magnetic poles.

Fourth Embodiment

Figure 11:
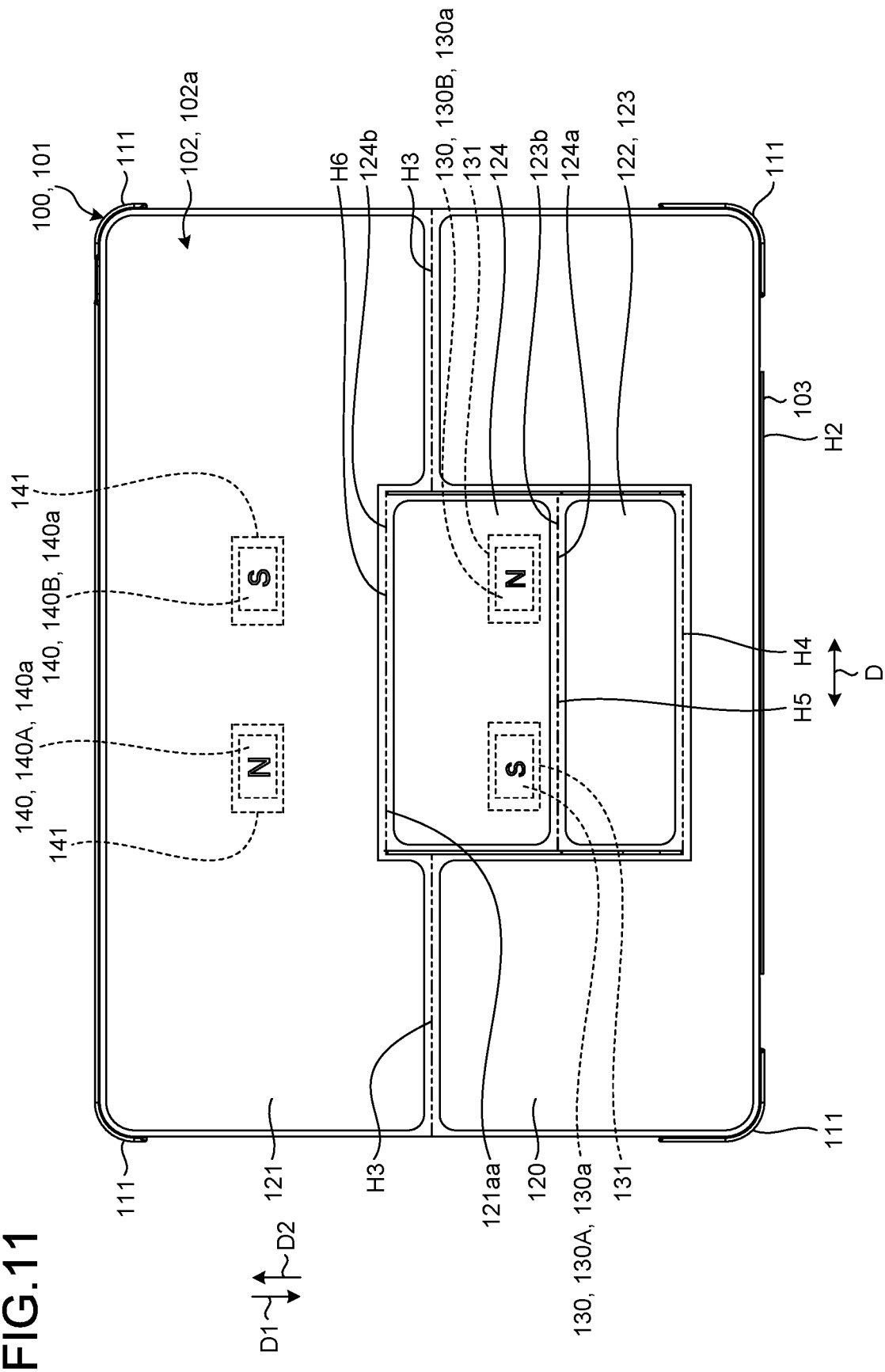
FIG. 11 is an exemplary plan view of an electronics stand in a fourth embodiment, while an expanded plate member and a mount are placed on top of each other.

FIG. 11 is an exemplary plan view of the electronics stand 100 in the fourth embodiment, while the plate member 102 is expanded and placed on the mount 101.

In the fourth embodiment, the magnets 130A and 130B are disposed closer to the first side 124a of the second part 124 rather than to the second side 124b. Thereby, the magnets 130 and 140 are further away from the hinge H6 than when they are placed closer to the second side 124b of the second part 124 rather than to the first side 124a. This arrangement can increase the coupling force between the magnets 130 and 140.

Fifth Embodiment

Figure 12:
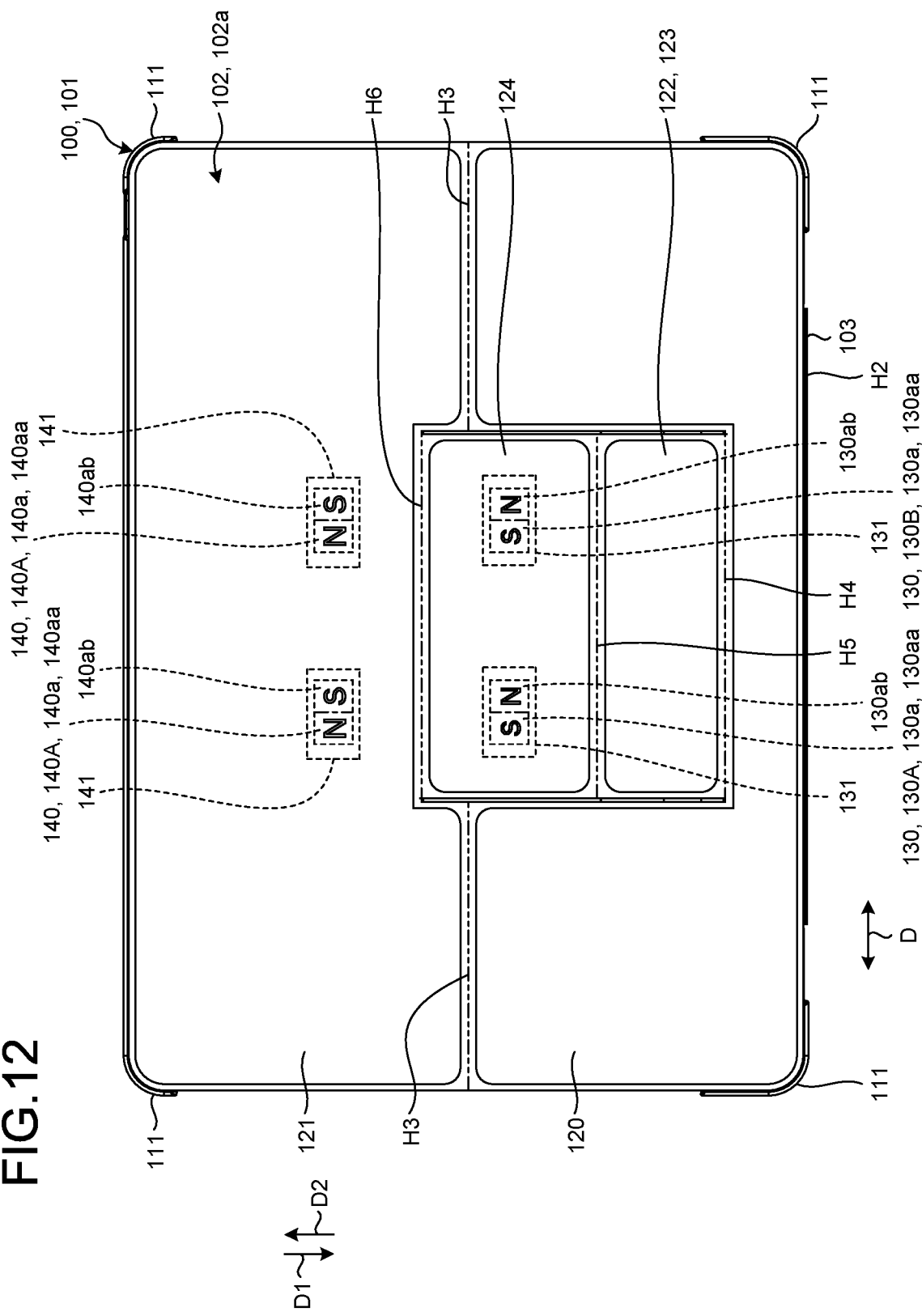
FIG. 12 is an exemplary plan view of an electronics stand in a fifth embodiment, while an expanded plate member and a mount are placed on top of each other.

FIG. 12 is an exemplary plan view of the electronics stand 100 in the fifth embodiment, while the plate member 102 is expanded and placed on the mount 101.

The first faces 130a of the magnets 130 are magnetized with two different magnetic poles. Specifically, the first faces 130a of the magnets 130 each include two areas 130aa and 130ab magnetized with mutually different magnetic poles. Similarly, the first faces 140a of the magnets 140 are magnetized with two different magnetic poles. Specifically, the first faces 140a of the magnets 140 each include two areas 140aa and 140ab magnetized with mutually different magnetic poles. Every two adjacent magnets 130 and the magnets 140 juxtaposed in the crosswise direction D have mutually different magnetic poles. In such arrangement the magnetic forces of the magnets 130 and 140 can be enhanced.

Sixth Embodiment

Figure 13:
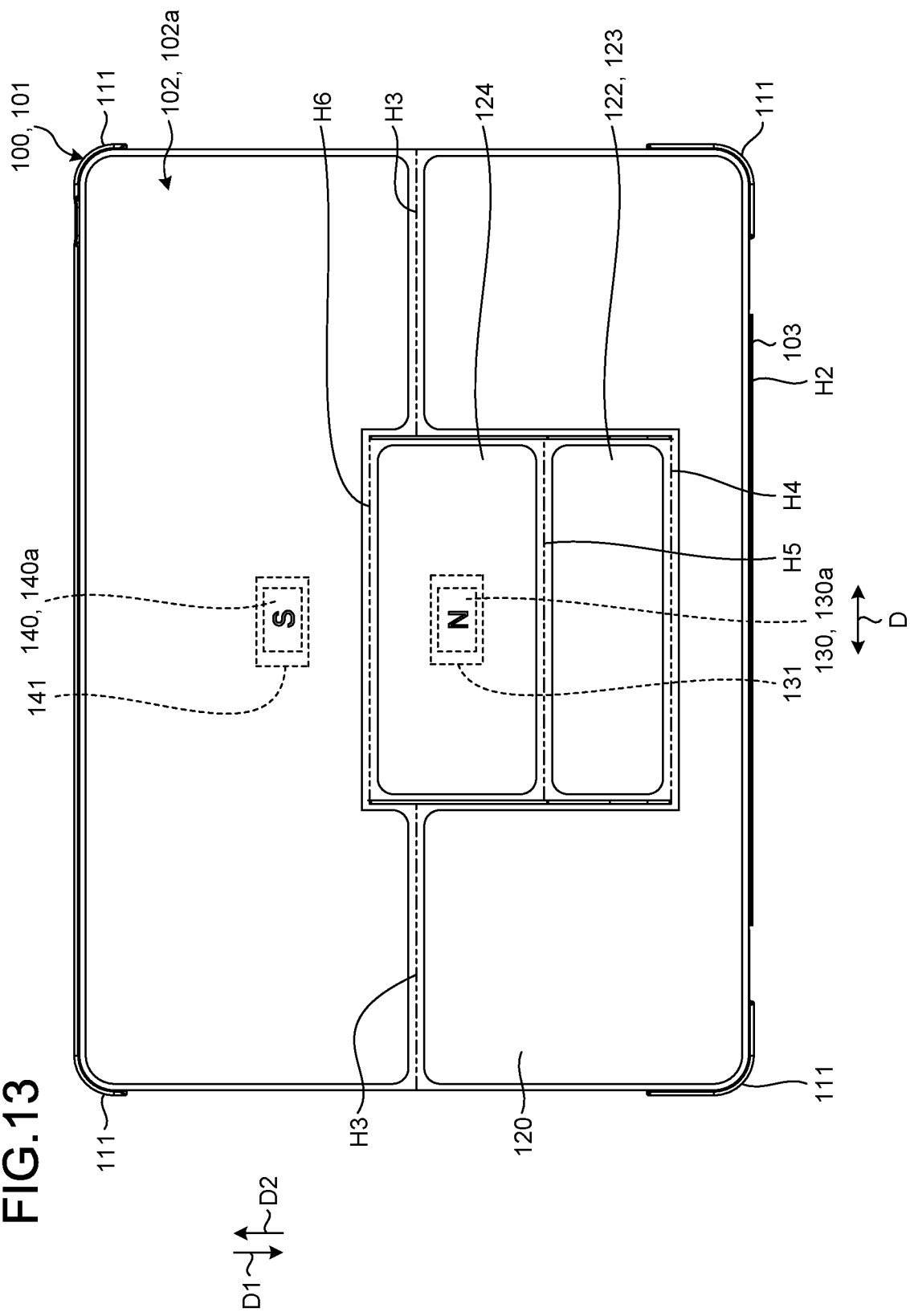
FIG. 13 is an exemplary plan view of an electronics stand in a sixth embodiment, while an expanded plate member and a mount are placed on top of each other.

FIG. 13 is an exemplary plan view of the electronics stand 100 in the sixth embodiment, while the plate member 102 is expanded and placed on the mount 101.

In the sixth embodiment the numbers of the magnets 130 and the magnets 140 are both one. Thereby, the structure of the electronics stand 100 can be simplified as compared with the one including the multiple magnets 130 and the multiple magnets 140.

Seventh Embodiment

Figure 14:
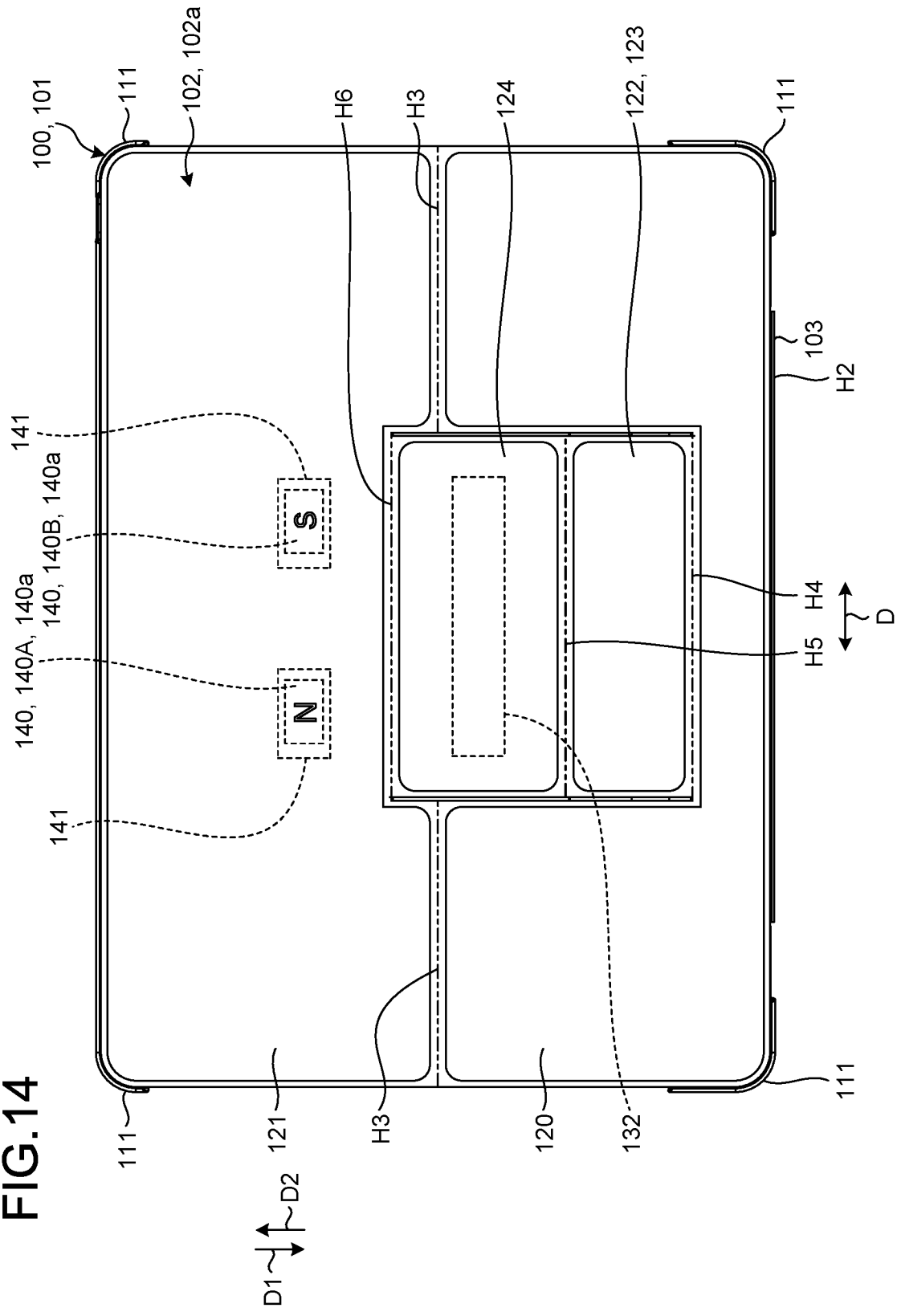
FIG. 14 is an exemplary plan view of an electronics stand in a seventh embodiment, while an expanded plate member and a mount are placed on top of each other.

FIG. 14 is an exemplary plan view of the electronics stand 100 in the seventh embodiment, while the plate member 102 is expanded and placed on the mount 101.

In the seventh embodiment, the second part 124 includes one magnetic material 132 not magnetized, instead of the magnet 130. The magnetic material 132 is coupled to the two magnets 140 in the second part 124 by the magnetic force of the magnets 140.

According to one aspect of this disclosure, when the user folds the second plate and the second part in the correct direction, for example, the magnetic shield members are located outside the area between the magnets in the second plate and the magnets in the second part, which prevents the magnetic shield members from weakening the magnetic coupling forces of the magnets in the second plate and the magnets in the second part. Meanwhile, if the user folds the second plate and the second part in the wrong direction opposite the correct direction, the magnetic shield members are placed between the magnets in the second plate and the magnets in the second part, so that the magnetic shield members weaken the magnetic coupling forces of the magnets in the second plate and the magnets in the second part. This makes it easier for the user to recognize folding of the second plate and the second part in the wrong direction. The plate member can thus be prevented from being folded in the wrong direction for use.

According to one aspect of this disclosure, when the second plate and the second part are folded in the correct direction, for example, the second plate and the second part are attracted to each other by the magnetic coupling forces of the magnets in the second plate and the magnets in the second part during the folding process. This action works to facilitate the folding of the second plate and the second part.

According to one aspect of this disclosure, for example, the electronics stand can be reduced in weight, as compared with use of a single magnet with a width equivalent to a crosswise width of the row of the magnets and generating magnetic forces.

According to one aspect of this disclosure, for example, the overall magnetic force of the crosswise aligned magnets can be increased, as compared with two adjacent magnets with the same pole aligned in the crosswise direction to generate magnetic forces.

According to one aspect of this disclosure, for example, the folding angle of the second plate with respect to the mount can be more accurately set than the second side of the second plate contacting the back face of the electronic device.

In accordance with one aspect of this disclosure, an electronics stand that can prevent the plate member from being folded in a wrong direction for use can be provided.

While certain embodiments have been described, these embodiments have been presented by way of example only, and are not intended to limit the scope of the inventions. Indeed, the novel methods and systems described herein may be embodied in a variety of other forms; furthermore, various omissions, substitutions, combinations, and changes in the form of the methods and systems described herein may be made without departing from the spirit of the inventions. The accompanying claims and their equivalents are intended to cover such forms or modifications as would fall within the scope and spirit of the inventions. Specifications including configurations or forms (structure, kind, direction, type, size, length, width, thickness, height, number, arrangement, position, material, and the like) can be appropriately modified for implementation.

What is claimed is:

1. An electronics stand, comprising:
   a mount on which an electronic device is mounted; and
   a plate member coupled to the mount, wherein
   the plate member comprises:
     a first plate having a first side connected to the mount and a second side opposite the first side of the first plate;
     a second plate having a first side foldably connected to the second side of the first plate and a second side opposite the first side of the second plate;
     a restrictor including a first part foldably connected to the first plate and a second part foldably connected to the first part and to the second plate;
     a plurality of magnetic materials placed in the second plate and the second part where at least one of the magnetic materials generates a magnetic force; and
     a magnetic shield member disposed in either of the second plate and the second part which includes the at least one of the magnetic material that generates the magnetic force, wherein
   the plate member changes in posture between an expanded form and a folded form, the expanded form is a form in which the first plate, the second plate, and the restrictor are expanded, the folded form is a form in which the second plate is folded with respect to the first plate and placed on the second part such that the second side of the second plate supports a back face of the electronic device, the magnetic material of the second plate and the magnetic material of the second part are juxtaposed and coupled together by the magnetic force in a direction in which the second plate is placed on the second part, and the restrictor limits folding of the second plate with respect to the first plate, and
   in the folded form, the magnetic shield member is disposed outside at least either of the magnetic material of the second plate and the magnetic material of the second part that generates the magnetic force, in the direction in which the second plate is placed on the second part, to weaken the magnetic force of the magnetic material toward the outside.

2. The electronics stand according to claim 1, wherein
   the plate member elastically deforms from the expanded form to the folded form, and
   in the folded form, the magnetic material of the second plate and the magnetic material of the second part are coupled together by the magnetic force against an elastic force of elastic deformation of the plate member.

3. The electronics stand according to claim 1, wherein at least either of the second plate and the second part includes a plurality of magnetic materials that is juxtaposed in a first direction to generate a magnetic force, wherein the first direction is along the first side of the first plate.

4. The electronics stand according to claim 3, wherein among the magnetic materials juxtaposed in the first direction to generate the magnetic force, two adjacent magnetic materials have mutually different magnetic poles.

5. The electronics stand according to claim 1, wherein
   the mount has a wall that covers at least part of the back face of the electronic device, and
   the second side of the second plate contacts the wall in the folded form.

* * * * *